(12) United States Patent
Park et al.

(10) Patent No.: US 9,509,375 B2
(45) Date of Patent: Nov. 29, 2016

(54) WIRELESS TRANSCEIVER CIRCUIT WITH REDUCED AREA

(71) Applicants: SK HYNIX INC., Icheon (KR); Soongsil University Foundation of University-Industry Cooperation, Seoul (KR)

(72) Inventors: Chang-Kun Park, Seoul (KR); Chang-Hyun Lee, Seoul (KR); Suk-Hyeon Yoon, Seoul (KR); Hyung-Jun Cho, Icheon (KR); Jun-Gi Choi, Icheon (KR); Jin-Ho Yoo, Seoul (KR)

(73) Assignees: SK HYNIX INC., Icheon (KR); SOONGSIL UNIVERSITY FOUNDATION OF UNIVERSITY-INDUSTRY COOPERATION, Seoul (KR)

( * ) Notice: Subject to any disclaimer, the term of this patent is extended or adjusted under 35 U.S.C. 154(b) by 381 days.

(21) Appl. No.: 14/147,421

(22) Filed: Jan. 3, 2014

(65) Prior Publication Data

US 2015/0035374 A1    Feb. 5, 2015

(30) Foreign Application Priority Data

Aug. 1, 2013  (KR) .......... 10-2013-0091292
Aug. 8, 2013  (KR) .......... 10-2013-0094350

(51) Int. Cl.
 *H04H 40/18*  (2008.01)
 *H04B 5/00*   (2006.01)
 (Continued)

(52) U.S. Cl.
 CPC .......... *H04B 5/0037* (2013.01); *H04B 5/0031* (2013.01); *H04B 5/0075* (2013.01); *H04B 5/0093* (2013.01); *H04B 5/02* (2013.01); *H04H 40/18* (2013.01); *H04Q 3/00* (2013.01)

(58) Field of Classification Search
 CPC ................. H04H 40/18; H04Q 3/00
 USPC ......................................... 307/115
 See application file for complete search history.

(56) References Cited

U.S. PATENT DOCUMENTS 4,602,309 A * 7/1986 Gaude ............. H03K 17/663
                                              361/190
7,768,790 B2   8/2010 Kuroda et al.
(Continued)

FOREIGN PATENT DOCUMENTS

KR  10-2012-0031164 A   3/2012
KR  10-2012-0133078 A  12/2012
(Continued)

OTHER PUBLICATIONS

C. Lee et al., "X-Band CMOS Power Amplifier Using Mode-Locking Method for Sensor Applicants", Journal of Electromagnetic Waves and Applications, 2012, pp. 633-640, vol. 26:5-6.
(Continued)

*Primary Examiner* — Adi Amrany

(57) ABSTRACT

A wireless power transmission/reception system includes a wireless power transmission circuit and a wireless power reception circuit. The wireless power transmission circuit includes an oscillator, a DC-AC converter that converts a direct current to an alternating current and is turned on/off in response to a control signal, a power transmission coil that transmits AC power, a signal reception coil, and a signal receiver that transfers the control signal to the DC-AC converter. The wireless power reception circuit includes a power reception coil, a rectifier that converts an alternating current to a direct current and is turned on or off in response to the control signal, an control signal generator that generates the control signal, a signal transmission coil, and a signal transmitter that transmits the control signal through the signal transmission coil.

7 Claims, 12 Drawing Sheets

(51) Int. Cl.
*H04Q 3/00* (2006.01)
*H04B 5/02* (2006.01)

(56) References Cited

U.S. PATENT DOCUMENTS

| 8,005,119 | B2  | 8/2011  | Kuroda |               |
|-----------|-----|---------|--------|---------------|
| 2009/0057039 | A1* | 3/2009 | Kuroda | H04B 5/0012 178/43 |
| 2009/0196312 | A1* | 8/2009 | Kuroda | H04J 3/047 370/503 |
| 2009/0196388 | A1* | 8/2009 | Fukaishi | H01L 23/48 375/360 |
| 2009/0267848 | A1* | 10/2009 | Kuroda | H01Q 1/2283 343/720 |
| 2009/0322383 | A1* | 12/2009 | Fukaishi | H01L 23/48 327/110 |
| 2011/0156488 | A1* | 6/2011 | Kuroda | H01L 23/48 307/104 |
| 2011/0201271 | A1* | 8/2011 | Kuroda | G01R 31/3025 455/41.1 |
| 2011/0255352 | A1* | 10/2011 | Kuroda | G06K 19/07749 365/191 |
| 2012/0133324 | A1  | 5/2012 | Baarman et al. | |

FOREIGN PATENT DOCUMENTS

| KR | 10-1283961 | B1 | 7/2013 |
| KR | 10-1495823 | B1 | 2/2015 |
| KR | 10-1538486 | B1 | 7/2015 |
| KR | 10-1538664 | B1 | 7/2015 |
| KR | 10-1608757 | B1 | 4/2016 |

OTHER PUBLICATIONS

Changhyun Lee et al., "Study of the Coil Structure for Wireless Chip-to-Chip Communication Applications", Progress in Electromagnetics Research Letters, 2013, pp. 127-136, vol. 38.

Changhyun Lee et al., "Transceiver with inductive coupling for wireless chip-to-chip communication using a 50-nm digital CMOS process", Microelectronics Journal, 2013, pp. 852-859, vol. 44.

C. Lee et al., "X-Band CMOS Power Amplifier Using Mode-Locking Method for Sensor Applicants", Journal of Electromagnetic Waves and Applications, Jul. 25, 2012 , pp. 633-640, vol. 26:5-6.

Changhyun Lee et al., "Study of the Coil Structure for Wireless Chip-to-Chip Communication Applications", Progress in Electromagnetics Research Letters, Mar. 13, 2013, pp. 127-136, vol. 38.

Changhyun Lee et al., "Transceiver with inductive coupling for wireless chip-to-chip communication using a 50-nm digital CMOS process", Microelectronics Journal, Aug. 13, 2013, pp. 852-859, vol. 44.

* cited by examiner

WIRELESS TRANSCEIVER CIRCUIT WITH REDUCED AREA

CROSS-REFERENCE TO RELATED APPLICATIONS

The present application claims priority to Korean Patent Application No. 10-2013-0091292, filed on Aug. 1, 2013, and to Korean Patent Application No. 10-2013-0094350, filed on Aug. 8, 2013, which are incorporated herein by reference in their entirety.

BACKGROUND

Embodiments of the present invention relate to a technology for wirelessly transmitting and receiving signals and power, and more particularly, to a technology for transmitting and receiving a signals and power between integrated circuit (IC) chips or between an IC chip and test equipment in a near field.

Before many types of ICs, including memories, are delivered to customers, whether the ICs operate normally is tested before and after a packaging step. This includes testing the ICs during a wafer test step, before the ICs formed on a wafer are singulated into individual IC chips. In the related art, the wafer test step is performed by placing probe tips, referred to herein as needles, in contact with pads of an IC formed on the wafer and transmitting and receiving signals using the needles. The needles used in the wafer test step are formed on a probe card. The number of needles on the probe card corresponds to the product of the number of IC chips which can be simultaneously tested using the probe card, which may include all of the IC chips formed on one wafer, and the number of pads to be probed in each IC chip.

In a wired test scheme in which signals are transmitted and received using needles formed on a probe card, problems arise from having a large number of needles on the probe card. Particularly, an increase in the number of ICs formed on each wafer, in the number of ICs simultaneously tested using the probe card, and/or in the number of pads formed on an IC results in an increase in the number of needles. The increased number of needles produces an increase in a pressure applied to a wafer by the probe card.

To solve the problems of the aforementioned wired test scheme, a technology has been proposed in which signals are wirelessly exchanged between an IC on a wafer and a probe card, or wirelessly exchanged between a plurality of IC chips stacked in one package. The technology uses the wireless signal transmission/reception technology using inductively coupled coils disclosed in Korean Patent Reg. No. 1066128.

SUMMARY

Embodiments of the present invention are directed towards reducing an area of a wireless transceiver circuit and towards wirelessly transmitting and receiving power.

In accordance with an embodiment of the present invention, a wireless transceiver circuit includes: a coil; a first pull-up driver configured to source a current to a first terminal of the coil; a first pull-down driver configured to sink a current from the first terminal of the coil; a second pull-up driver configured to source a current to a second terminal of the coil; a second pull-down driver configured to sink a current from the second terminal of the coil; and a controller configured to activate the first pull-up driver and the second pull-down driver or activate the second pull-up driver and the first pull-down driver in a transmission operation of the wireless transceiver circuit, and to activate the first pull-up driver, the first pull-down driver, the second pull-up driver, and the second pull-down driver in a reception operation of the wireless transceiver circuit.

A wireless reception circuit in accordance with another embodiment of the present invention includes a coil, and a differential latch that latches a voltage change in the first terminal of the coil and a voltage change in the second terminal of the coil, and generates a positive signal and a negative signal. The wireless reception circuit may further include a differential amplifier that amplifies the positive signal and the negative signal. The differential latch includes a first load coupled between a high voltage terminal and a negative output terminal on which the negative signal is loaded, a first pull-down driver that pull-down drives the negative output terminal in response to a voltage of the first terminal of the coil, a second load coupled between the high voltage terminal and a positive output terminal on which the positive signal is loaded, a second pull-down driver that pull-down drives the positive output terminal in response to a voltage of the second terminal of the coil, a third pull-down driver that pull-down drives the negative output terminal in response to a voltage of the positive output terminal; and a fourth pull-down driver that pull-down drives the positive output terminal in response to a voltage of the negative output terminal. The differential amplifier includes a third load coupled between the high voltage terminal and a negative data terminal, a fifth pull-down driver that pull-down drives the negative data terminal in response to the voltage of the positive output terminal, a fourth load coupled between the high voltage terminal and a positive data terminal, and a sixth pull-down driver that pull-down drives the negative data terminal in response to the voltage of the negative output terminal. The wireless reception circuit may further include a bias voltage applying terminal, a first resistor between the bias voltage applying terminal and the first terminal of the coil, and a second resistor between the bias voltage applying terminal and the second terminal of the coil. A transmission circuit for transmitting a signal through the coil may be coupled to the first terminal and the second terminal of the coil, and may apply a predetermined level of voltage to the first terminal and the second terminal of the coil at the time of activation of a reception circuit.

A wireless transceiver circuit in accordance with another embodiment of the present invention includes a coil, a reception circuit that receives signal using a voltage change at both terminals of the coil, and a transmission circuit that induces the voltage change at both terminals of the coil to transmit a signal, and applies a predetermined voltage to both terminals of the coil in an operation of the reception circuit. The transmission circuit may allow a current to flow from the first terminal to the second terminal of the coil when transmission data changes from 'low' to 'high', and allow a current to flow from the second terminal to the first terminal of the coil when the transmission data changes from 'high' to 'low'.

In accordance with another embodiment of the present invention, a wireless power transmission circuit includes: an oscillator; a DC-AC converter configured to convert a direct current to an alternating current in response to a periodic wave generated by the oscillator and to be turned on/off in response to an on/off signal; a power transmission coil configured to transmit AC power converted by the DC-AC converter; a signal reception coil; and a signal receiver configured to transfer the on/off signal received through the signal reception coil to the DC-AC converter.

In accordance with another embodiment of the present invention, a wireless power reception circuit includes: a power reception coil; a rectifier configured to convert an alternating current received through the power reception coil to a direct current and to be turned on/off in response to an on/off signal; an on/off signal generator configured to generate the on/off signal indicating whether a level of a direct voltage converted by the rectifier is sufficient; a signal transmission coil; and a signal transmitter configured to transmit the on/off signal through the signal transmission coil.

In accordance with another embodiment of the present invention, a wireless power transmission/reception system includes a wireless power transmission circuit and a wireless power reception circuit. The wireless power transmission circuit includes: an oscillator; a DC-AC converter configured to convert a direct current to an alternating current in response to a periodic wave generated by the oscillator and to be turned on/off in response to an on/off signal; a power transmission coil configured to transmit AC power converted by the DC-AC converter; a signal reception coil; and a signal receiver configured to transfer the on/off signal received through the signal reception coil to the DC-AC converter. The wireless power reception circuit includes: a power reception coil; a rectifier configured to convert an alternating current received through the power reception coil to a direct current and to be turned on/off in response to the on/off signal; an on/off signal generator configured to generate the on/off signal indicating whether a level of a direct voltage converted by the rectifier is sufficient; a signal transmission coil; and a signal transmitter configured to transmit the on/off signal through the signal transmission coil.

According to the embodiments of the present invention, the wireless transmission circuit supplies a bias voltage for the wireless reception circuit and therefore a separate circuit for applying the bias voltage is not necessary. Furthermore, the first stage of the wireless reception circuit is realized by a differential latch, so that it is possible to amplify a signal of the coil and simultaneously to restore digital data.

In addition, according to the embodiments of the present invention, the wireless power reception circuit receiving substantially more power than necessary is prevented. Specifically, the power transmission of the wireless power transmission circuit is effectively turned on and off.

DETAILED DESCRIPTION

Figure 1:
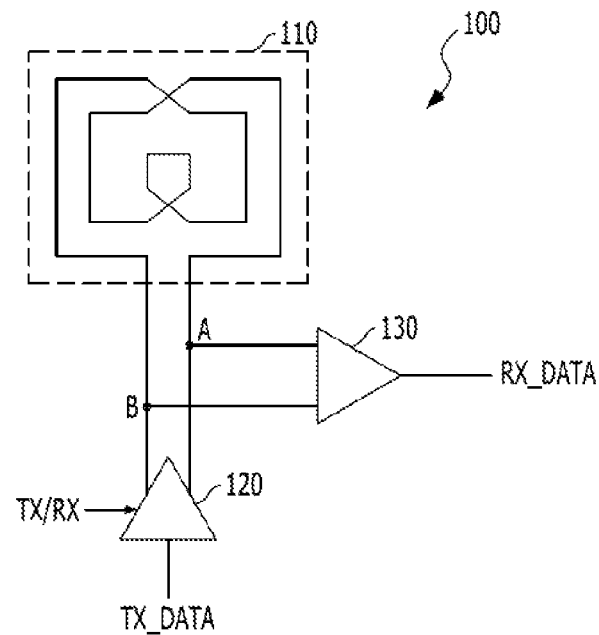
FIG. 1 is a diagram of a wireless transceiver circuit in accordance with an embodiment of the present invention.

Embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a diagram of a wireless transceiver circuit 100 in accordance with an embodiment of the present invention. The wireless transceiver circuit 100 includes a coil 110, a transmission circuit 120, and a reception circuit 130.

The coil 110 of the wireless transceiver circuit 100 creates inductive coupling with a coil of another wireless transceiver circuit, and exchanges a signal therewith. The coil 110 has first and second terminals A and B, and transmits and/or receives a signal according to whether a current flows from the first terminal A to the second terminal B or from the second terminal B to the first terminal A. In an embodiment, the coil 110 is formed using an interconnection on a substrate in which the wireless transceiver circuit 100 is formed, such as, for example, an interconnect in a metal layer of an IC chip of a semiconductor wafer, or a trace in a package or printed circuit board.

The transmission circuit 120 transmits transmission data TX_DATA through the coil 110. In wireless data transmission using the coil 110, the data transmission is performed when the transmission data TX_DATA changes. For example, when the transmission data TX_DATA changes from 'low' to 'high', the transmission circuit 120 is driven such that a current flows from the first terminal A to the second terminal B of the coil 110, and when the transmission data TX_DATA changes from 'high' to 'low', the transmission circuit 120 is driven such that a current flows from the second terminal B to the first terminal A of the coil 110.

When the wireless transceiver circuit 100 receives data, that is, when the reception circuit 130 receives data, the transmission circuit 120 applies a predetermined level of bias voltage to both terminals A and B of the coil 110. In FIG. 1, a signal TX/RX has a first value when the wireless transceiver circuit 100 transmits data and has a second value when the wireless transceiver circuit 100 receives data.

The reception circuit 130 detects a change in a voltage induced across terminals A and B of the coil 110 and generates reception data RX_DATA. In order for the reception circuit 130 to accurately detect a small voltage change across the terminals A and B of the coil 110, a predetermined bias voltage is applied to both terminals A and B of the coil 110. In an embodiment, since the bias voltage is supplied by the transmission circuit 120 during the operation of the reception circuit 130, a separate circuit for applying the bias voltage to both terminals A and B of the coil 110 is not necessary.

Figure 2:
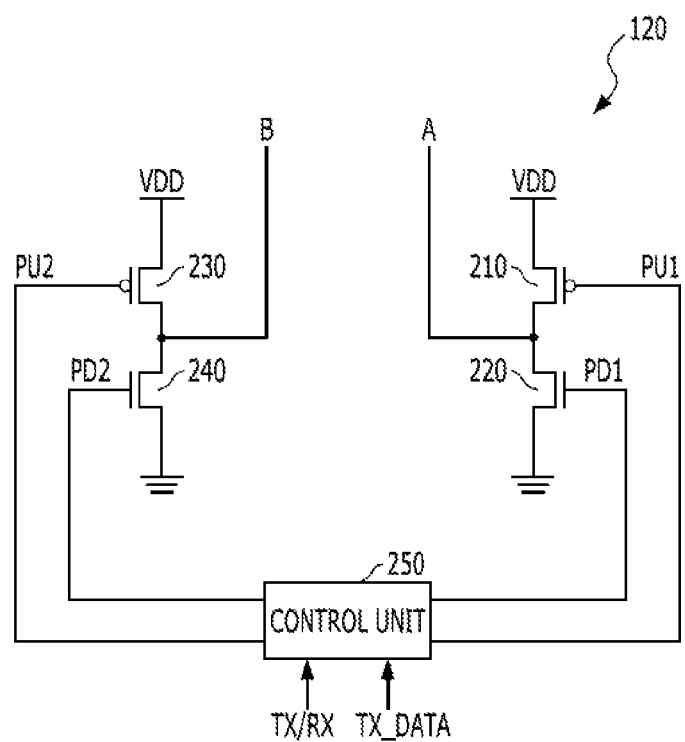
FIG. 2 is a diagram of a wireless transmission circuit in accordance with an embodiment.

FIG. 2 is a diagram of the transmission circuit 120 of FIG. 1 in accordance with one embodiment. The transmission circuit 120 includes a first pull-up driver 210, a first pull-down driver 220, a second pull-up driver 230, a second pull-down driver 240, and a controller 250.

The first pull-up driver 210 is configured for sourcing a current to the first terminal A of the coil 110, and when activated applies a high voltage VDD to the first terminal A. The first pull-up driver 210 is activated in response to a first pull-up driving signal PU1, and may include a PMOS transistor as illustrated in FIG. 2.

In FIG. 2, the high voltage applied to the first terminal A of the coil 110 by the first pull-up driver 210 is indicated by a power supply voltage VDD. However, a person of skill in the art in light of the teachings and disclosures herein would understand that any sufficiently high voltage may be used.

The first pull-down driver 220 is configured for sinking a current from the first terminal A of the coil 110, and when activated applies a low voltage to the first terminal A. The first pull-down driver 220 is activated in response to a first pull-down driving signal PD1, and may include an NMOS transistor as illustrated in FIG. 2.

In FIG. 2, the low voltage applied to the first terminal A of the coil 110 by the first pull-down driver 220 is indicated by a ground voltage. However, a person of skill in the art in light of the teachings and disclosures herein would understand that any sufficiently low voltage may be used.

The second pull-up driver 230 is configured for sourcing a current to the second terminal B of the coil 110, and when activated applies the high voltage VDD to the second terminal B. The second pull-up driver 230 is activated in response to a second pull-up driving signal PU2, and may include a PMOS transistor as illustrated in FIG. 2.

The second pull-down driver 240 is configured for sinking a current from the second terminal B of the coil 110, and when activated applies the low voltage to the second terminal B. The second pull-down driver 240 is activated in response to a second pull-down driving signal PD2, and may include an NMOS transistor as illustrated in FIG. 2.

Figure 17:
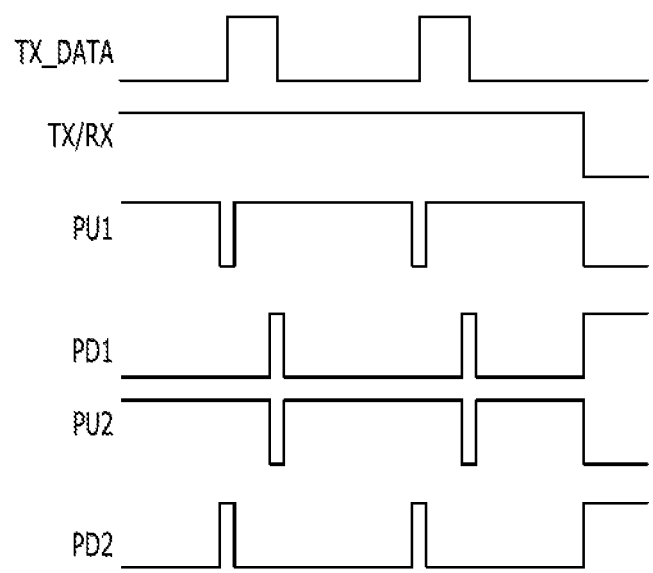
FIG. 17 is waveforms illustrating an operation of the wireless transmission circuit of FIG. 2.

The controller 250 generates the first pull-up driving signal PU1, the first pull-down driving signal PD1, the second pull-up driving signal PU2, and the second pull-down driving signal PD2. Table 1, below, and FIG. 17 illustrate an operation of the controller 250.

TABLE 1

|  | TX/RX = H | | | TX/RX = L |
|---|---|---|---|---|
|  | TX_DATA changes from L to H | TX_DATA changes from H to L | TX_DATA is not changing | do not care |
| PU1 | L (activation) | H (deactivation) | H (deactivation) | L (activation) |
| PD1 | L (deactivation) | H (activation) | L (deactivation) | H (activation) |
| PU2 | H (deactivation) | L (activation) | H (deactivation) | L (activation) |
| PD2 | H (activation) | L (deactivation) | L (deactivation) | H (activation) |

When the wireless transceiver circuit 100 transmits data (in the period in which TX/RX=H), the controller 250 generates the driving signals PU1, PD1, PU2, and PD2 such that a current may flow from the first terminal A of the coil 110 to the second terminal B of the coil 110 during a first transmission operation or from the second terminal B to the first terminal A during a second transmission operation. The first or second transmission operation occur when the transmission data TX_DATA changes.

When the transmission data TX_DATA changes from low (L) to high (H), the first transmission operation occurs. The controller 250 activates the first pull-up driving signal PU1 and the second pull-down driving signal PD2 to activate the first pull-up driver 210 and the second pull-down driver 240, respectively. When the first pull-up driver 210 and the second pull-down driver 240 are activated, a current flows from the first terminal A to the second terminal B.

When the transmission data TX_DATA changes from H to L, the second transmission operation occurs. The controller 250 activates the first pull-down driving signal PD1 and the second pull-up driving signal PU2 to activate the first pull-down driver 220 and the second pull-up driver 230, respectively. When the first pull-down driver 220 and the second pull-up driver 230 are activated, a current flows from the second terminal B to the first terminal A.

When TX/RX=H and the transmission data TX_DATA is not changing, the controller 250 deactivates all the driving signals PU1, PD1, PU2, and PD2 and thereby deactivates all the drivers 210, 220, 230, and 240.

When the wireless transceiver circuit 100 receives data (in the period in which TX/RX=L), the controller 250 activates all the driving signals PU1, PD1, PU2, and PD2 in order to activate all the drivers 210, 220, 230, and 240. Thus, a bias voltage having an intermediate voltage level between the high voltage VDD and the low voltage is applied to both terminals A and B of the coil 110, which enhances the accuracy of a data reception operation of the reception circuit 130.

For the level of the bias voltage applied to both terminals A and B of the coil 110 to be the intermediate voltage level between the high voltage and the low voltage when the wireless transceiver circuit 100 receives data, turn-on resistance values of the PMOS transistors 210 and 230 and the NMOS transistors 220 and 240 may be designed to be substantially equal to each other. "Substantially equal" includes a difference less than a process error within a margin of a fabrication process. The desired bias voltage applied to both terminals A and B of the coil 110 when the wireless transceiver circuit 100 receives data may be varied by the design, and a resistance ratio of the PMOS transistors 210 and 230 relative to the NMOS transistors 220 and 240 may be selected according to the desired bias voltage.

Figure 3:
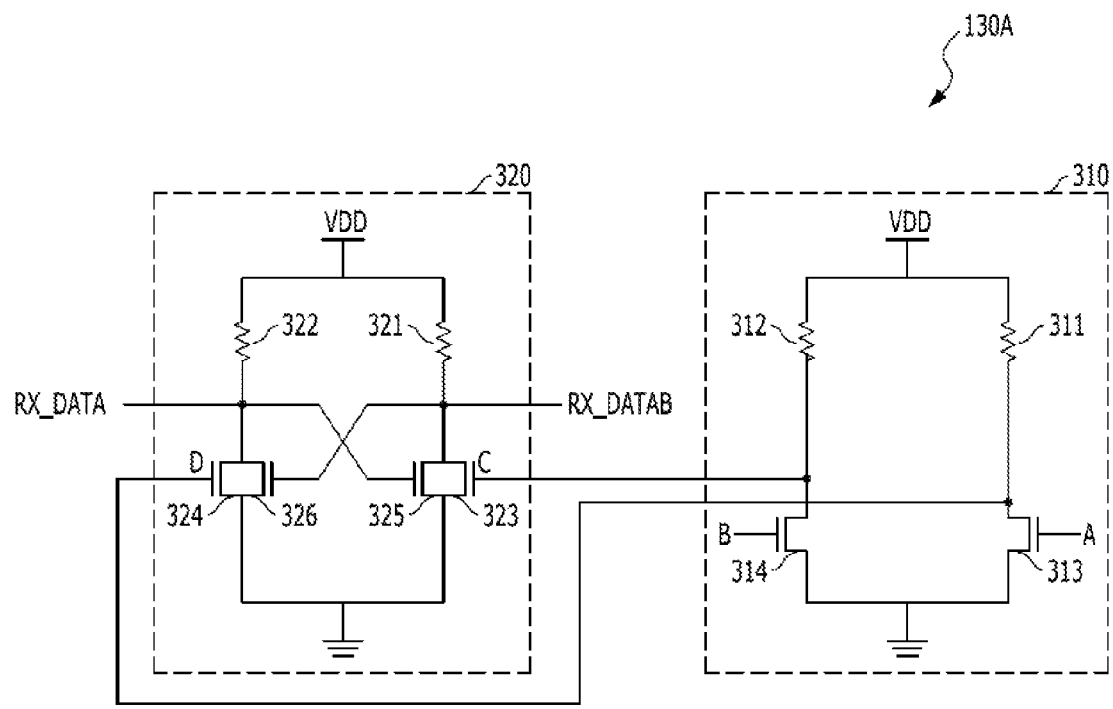
FIG. 3 is a circuit diagram of a wireless reception circuit in accordance with an embodiment.

FIG. 3 is a circuit diagram of a reception circuit 130A in accordance with an embodiment, which may be used in the reception circuit 130 of FIG. 1. The reception circuit 130A includes a differential amplifier 310 and a differential latch 320.

The differential amplifier 310 amplifies a voltage change across the first terminal A and the second terminal B of the coil 110, and outputs an amplified value to a positive output terminal C and a negative output terminal D. The differential amplifier 310 includes a load 311 coupled between a high voltage terminal VDD and the negative output terminal D, a load 312 coupled between the high voltage terminal VDD and the positive output terminal C, a pull-down driver 313 that pull-down drives the negative output terminal D in response to the voltage of the first terminal A, and a pull-down driver 314 that pull-down drives the positive output terminal C in response to the voltage of the second terminal B.

The differential latch 320 amplifies and latches a voltage difference between the positive output terminal C and the negative output terminal D, and thereby restores reception data. The differential latch 320 includes a load 321 coupled between the high voltage terminal VDD and a negative data terminal RX_DATAB, a load 322 coupled between the high voltage terminal VDD and a positive data terminal RX_DATA, a pull-down driver 323 that pull-down drives the negative data terminal RX_DATAB in response to the voltage of the positive output terminal C, and a pull-down driver 324 that pull-down drives the positive data terminal RX_DATA in response to the voltage of the negative output terminal D. The differential latch 320 further includes a pull-down driver 325 that pull-down drives the negative data terminal RX_DATAB in response to the voltage of the positive data terminal RX_DATA, and a pull-down driver 326 that pull-down drives the positive data terminal RX_DATA in response to the voltage of the negative data terminal RX_DATAB.

As illustrated in FIG. 3, the loads 311, 312, 321, and 322 may be resistors, and the pull-down drivers 323, 324, 325, and 326 may be NMOS transistors.

Figure 4:
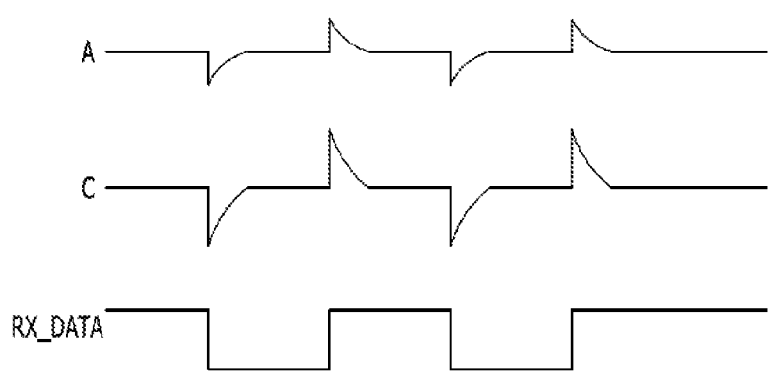
FIG. 4 is waveforms illustrating voltage changes related to the wireless reception circuit of FIG. 3.

FIG. 4 illustrates waveforms related to the reception circuit 130A of FIG. 3. The waveforms show voltages at the first terminal A of the coil 110, the positive output terminal C, and the positive data terminal RX_DATA shown in FIG. 3.

As shown in FIG. 4, a voltage change at the first terminal A is amplified to produce the signal at the positive output terminal C. A person of skill in the art would understand that a complementary signal is produced at the negative output terminal D of FIG. 3.

When the signal at the positive output terminal C is driven low and the complementary signal at the negative output terminal D (not shown) is driven high, the differential latch 320 is caused to enter a first state. When the differential latch 320 is in the first state, the positive data terminal RX_DATA outputs a low signal as shown in FIG. 4 and the negative data terminal RX_DATAB (not shown) complementally outputs a high signal.

The differential latch 320 maintains the first state until the signal at the positive output terminal C is driven high and the signal at the negative output terminal D is driven low, which causes the differential latch 320 to enter a second state. When the differential latch 320 is in the second state, the positive data terminal RX_DATA outputs a high signal and the negative data terminal RX_DATAB outputs a low signal.

The differential latch 320 maintains the second state until the signal at the positive output terminal C is driven low and the signal at the negative output terminal D is driven high.

Figure 5:
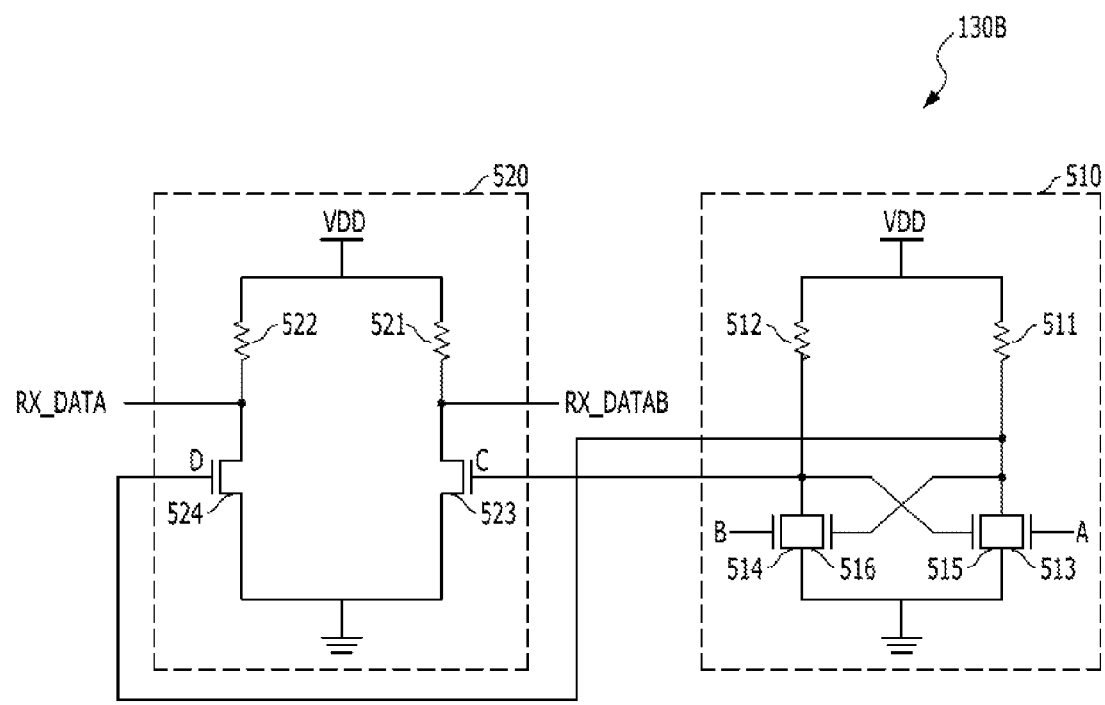
FIG. 5 is a circuit diagram of a wireless reception circuit in accordance with another embodiment.

FIG. 5 is a circuit diagram of a reception circuit 130B in accordance with another embodiment, which may be used in the reception circuit 130 of FIG. 1. The reception circuit 130B includes a differential latch 510 and a differential amplifier 520.

In the embodiment illustrated in FIG. 3, the first stage of the reception circuit 130A is the differential amplifier 310 and the second stage thereof is the differential latch 320. In contrast, in the embodiment of FIG. 5, the first stage of the reception circuit 130B is the differential latch 510 and the second stage is the differential amplifier 520.

The differential latch 510 latches voltage changes of the first terminal A and the second terminal B of the coil 110, and outputs restored data to a positive output terminal C and a negative output terminal D. Since the differential latch 510 is configured as the first stage of the reception circuit 130B, but has amplification and latch functions, output signals C and D of the differential amplifier 510 have the form of the restored data.

The differential latch 510 includes a load 511 coupled between a high voltage terminal VDD and the negative output terminal D, a load 512 coupled between the high voltage terminal VDD and the positive output terminal C, a pull-down driver 513 that pull-down drives the negative output terminal D in response to the voltage of the first terminal A of the coil 110, and a pull-down driver 514 that pull-down drives the positive output terminal C in response to the voltage of the second terminal B of the coil 110. The differential latch 510 further includes a pull-down driver 515 that pull-down drives the negative output terminal D in response to the voltage of the positive output terminal C, and a pull-down driver 516 that pull-down drives the positive output terminal C in response to the voltage of the negative output terminal D.

The differential amplifier 520 amplifies a voltage difference between the positive output terminal C and the negative output terminal D, and outputs an amplified signal to a positive data terminal RX_DATA and a negative data terminal RX_DATAB. The differential amplifier 520 includes a load 521 coupled between the high voltage terminal VDD and the negative data terminal RX_DATAB, a load 522 coupled between the high voltage terminal VDD and the positive data terminal RX_DATA, a pull-down driver 523 that pull-down drives the negative data terminal RX_DATAB in response to the voltage of the positive output terminal C, and a pull-down driver 524 that pull-down drives the positive data terminal RX_DATA in response to the voltage of the negative output terminal D.

As illustrated in FIG. 5, the loads 511, 512, 521, and 522 may be resistors, and the pull-down drivers 513, 514, 515, 516, 523, and 524 may be NMOS transistors.

Figure 6:
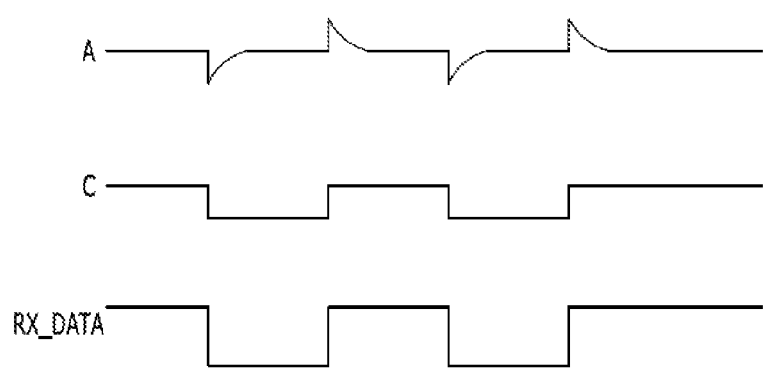
FIG. 6 is waveforms illustrating voltage changes related to the wireless reception circuit of FIG. 5.

FIG. 6 is waveforms related to the reception circuit 130B of FIG. 5, and illustrates voltage changes in the first terminal A of the coil 110, the positive output terminal C, and the positive data terminal RX_DATA. Referring to FIG. 6, because the first stage of the reception circuit 130 is configured as the differential latch 510, it is noted that a voltage level of the positive output terminal C has a form similar to the restored data.

As shown in FIG. 6, when the signal at the first terminal A goes low and the complementary signal at the second terminal B (not shown) goes high, the differential latch 510 is caused to enter a first state. When the differential latch 510 is in the first state, the positive output terminal C outputs a low signal and the negative output terminal D (not shown) outputs a high signal.

The differential latch 510 maintains the first state until the signal at the first terminal A goes high and the signal at the second terminal B goes low, which causes the differential latch 510 to enter a second state. When the differential latch 510 is in the second state, the positive output terminal C outputs a high signal and the negative output terminal D outputs a low signal.

The differential latch 510 maintains the second state until the signal at the first terminal A goes low and the signal at the second terminal B goes high.

The differential amplifier 520 amplifies the signals output on the positive output terminal C and the negative output terminal D to produce signals at the positive data terminal RX_DATA and the negative data terminal RX_DATAB.

Because the differential latch 510 is the first stage of the reception circuit 130B, transistors constituting the differential latch 510 should have high performance. In an embodiment wherein the differential latch 510 has sufficient amplification performance, digital data is directly restored by the differential latch 510, and the differential amplifier 520 is omitted.

Figure 7:
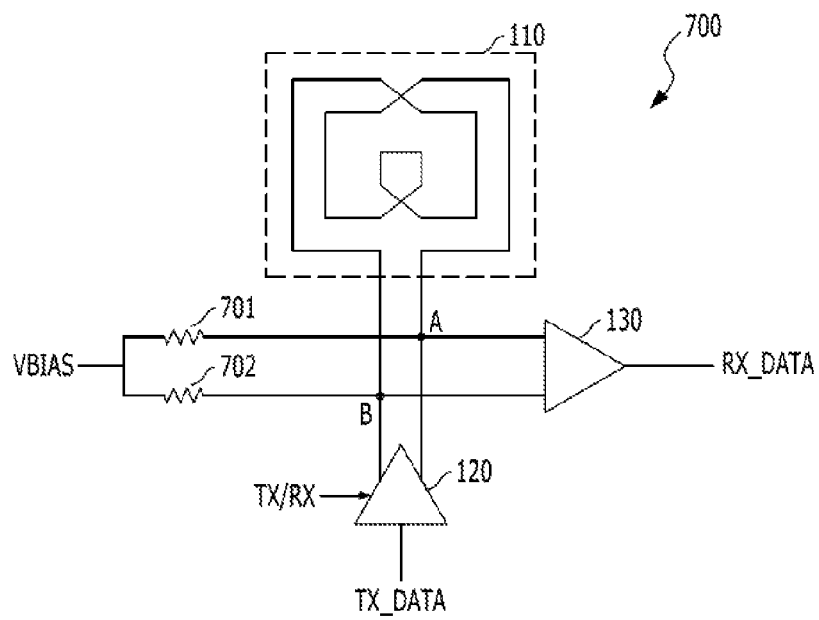
FIG. 7 is a diagram of a wireless transceiver circuit in accordance with another embodiment of the present invention.

FIG. 7 is a diagram of a wireless transceiver circuit 700 in accordance with another embodiment of the present invention.

The wireless transceiver circuit 700 includes the wireless transceiver circuit 100 of FIG. 1, and further includes a bias voltage applying terminal VBIAS and first and second resistors 701 and 702. The bias voltage applying terminal VBIAS and the resistors 701 and 702 provide a bias voltage VBIAS (such as, for example, a half of a high voltage level) to both terminals A and B of the coil 110.

In the embodiment of FIG. 7, since the bias voltage for the operation of the reception circuit 130 is applied to both terminals A and B of the coil 110 by the bias voltage applying terminal VBIAS and the resistors 701 and 702, the transmission circuit 120 does not need to supply the bias voltage for the reception circuit 130. Accordingly, in the embodiment of FIG. 7, the transmission circuit 120 may be designed such that all the internal drivers 210, 220, 230, and 240 are deactivated when the wireless transceiver circuit 700 receives data, that is, in the period in which TX/RX='L'.

Figure 8:
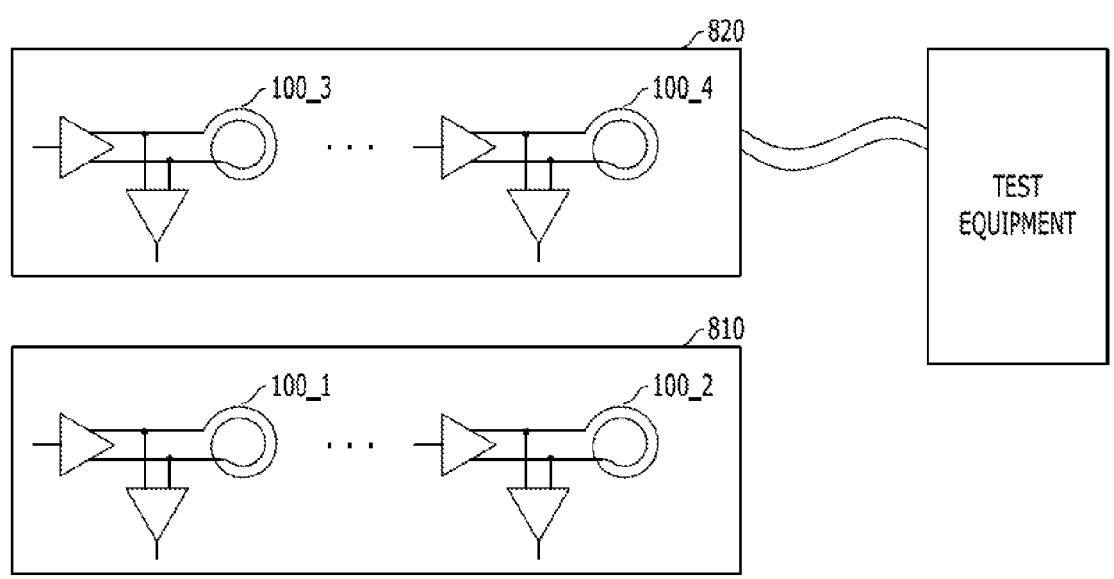
FIG. 8 and FIG. 9 are diagrams illustrating applications of a wireless transceiver circuit according to an embodiment.
Figure 9:
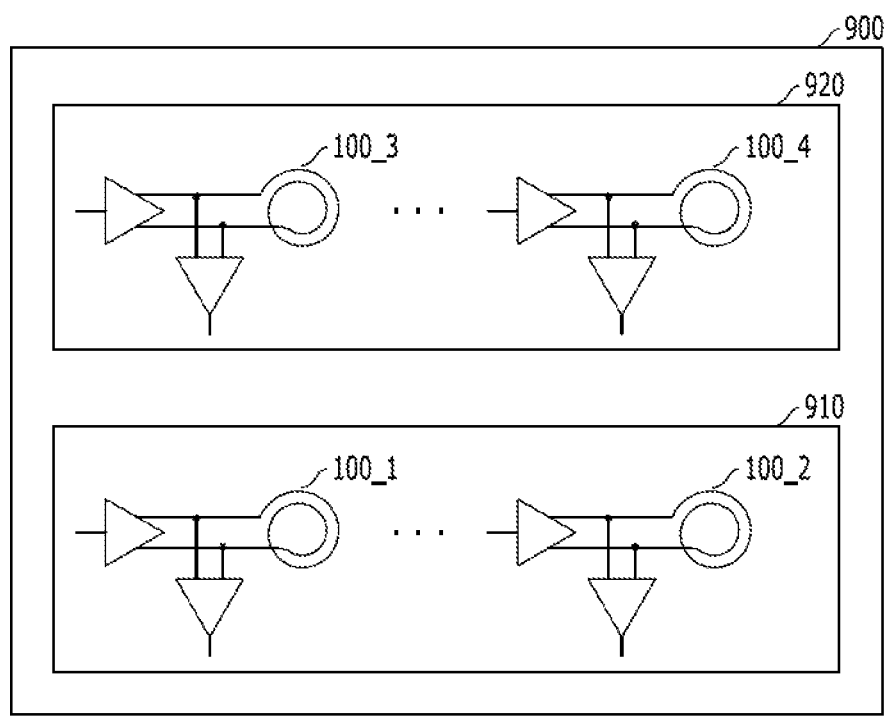

FIG. 8 and FIG. 9 are diagrams illustrating applications of a wireless transceiver circuit in accordance with an embodiment.

Referring to FIG. 8, wireless transceiver circuits 100_1 to 100_4 are provided to an IC chip 810 and a probe card 820, and are used to transmit and/or receive test signals. Coils of the wireless transceiver circuit 100_1 and the wireless transceiver circuit 100_3 use inductive coupling to exchange a signal, and coils of the wireless transceiver circuit 100_2 and the wireless transceiver circuit 100_4 use inductive coupling to exchange a signal. Because the IC chip 810 to be tested and the probe card 820 for testing the IC chip 810 wirelessly transmit and receive signals, the need for a number of conventional needles may be reduced or eliminated.

Referring to FIG. 9, wireless transceiver circuits 100_1 to 100_4 are provided to IC chips 910 and 920 stacked or otherwise incorporated together in a semiconductor package 900, and are used to transmit and receive signals between the IC chips 910 and 920 in the package 900. Coils of the wireless transceiver circuit 100_1 and the wireless transceiver circuit 100_3 use inductive coupling to exchange a signal, and coils of the wireless transceiver circuit 100_2 and the wireless transceiver circuit 100_4 use inductive coupling to exchange a signal. In the related art, a wire bond, a through-silicon via (TSV), or a similar wired interconnect are used to transmit and/or receive a signal between the chips 910 and 920 stacked in the package 900. However, these wired interconnects can be replaced with the wireless transceiver circuits 100_1 to 100_4.

In FIG. 1 to FIG. 9, a technology for wirelessly transmitting and/or receiving a signal has been described. Hereinafter, a technology for wirelessly transmitting and receiving power will be described.

Figure 10:
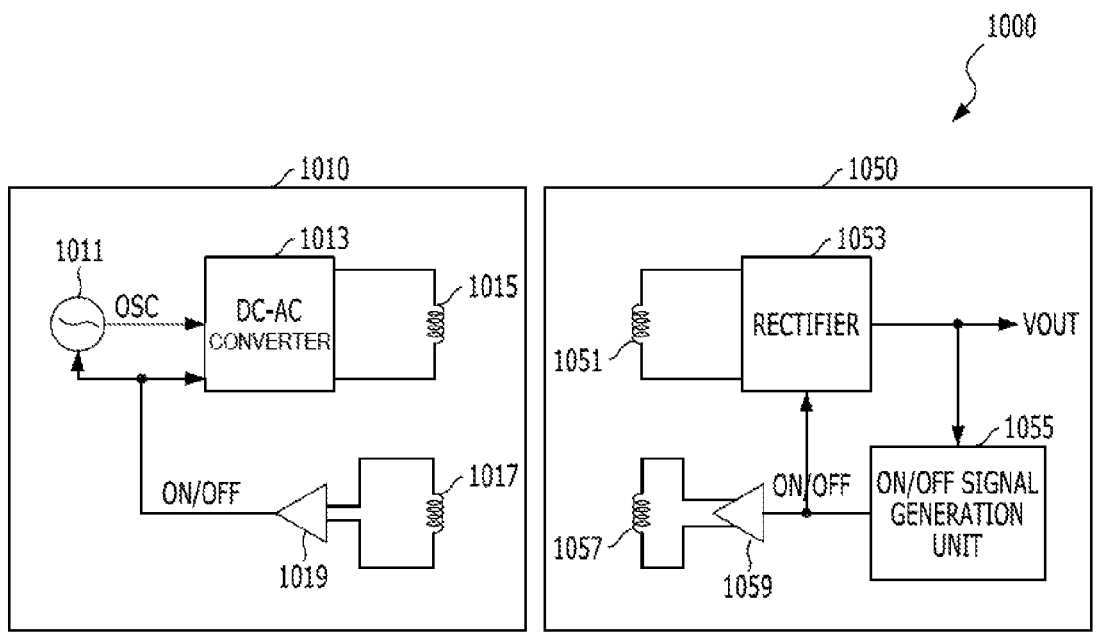
FIG. 10 is a diagram of a wireless power transmission/reception system in accordance with an embodiment of the present invention.

FIG. 10 is a circuit diagram of a wireless power transmission/reception system 1000 in accordance with an embodiment of the present invention. The wireless power transmission/reception system 1000 includes a wireless power transmission circuit 1010 and a wireless power reception circuit 1050.

Because the wireless power transmission circuit 1010 wirelessly transmits power and the wireless power reception circuit 1050 wirelessly receives the transmitted power, the wireless power transmission circuit 1010 and the wireless power reception circuit 1050 are generally provided to different apparatuses. In an embodiment, the wireless power transmission circuit 1010 and the wireless power reception circuit 1050 are provided to the probe card 820 and the IC chip 810 of FIG. 8, respectively, and are used to wirelessly supply power to the IC chip 810 during a test. In another embodiment, the wireless power transmission circuit 1010 and the wireless power reception circuit 1050 are provided to the IC chip 910 and the IC chip 920 of FIG. 9, respectively, and are used to supply power from the IC chip 910 to the IC chip 920.

The wireless power transmission circuit 1010 includes an oscillator 1011 that generates periodic waves on signals OSC and OSCB, and a DC-AC converter 1013 that converts a direct current into an alternating current in response to the periodic waves on signals OSC and OSCB. The oscillator 1011 and the DC-AC converter 1013 are turned on or off in response to a control signal, e.g., an on/off signal ON/OFF. The wireless power transmission circuit 1010 also includes a power transmission coil 1015 used to transmit the AC power generated by the DC-AC converter 1013.

The wireless power transmission circuit 1010 further includes a signal reception coil 1017 and a signal receiver 1019 that transfers the on/off signal ON/OFF received through the signal reception coil 1017 to the DC-AC converter 1013.

The wireless power reception circuit 1050 includes a power reception coil 1051, a rectifier 1053 that converts an alternating current received through the power reception coil 1051 into a direct current and is turned on or off in response to the on/off signal ON/OFF, and a control signal generator 1055 that generates the on/off signal ON/OFF indicating whether a level of a direct voltage VOUT produced using the rectifier 1053 is sufficiently high. The wireless power reception circuit 1050 further includes a signal transmitter 1059 that transmits the on/off signal ON/OFF generated by the control signal generator 1055 using a signal transmission coil 1057.

The power transmission coil 1015 of the wireless power transmission circuit 1010 is inductively coupled to the power reception coil 1051 of the wireless power reception circuit 1050. The signal transmission coil 1057 of the wireless power reception circuit 1050 is inductively coupled to the signal reception coil 1017 of the wireless power transmission circuit 1010.

When the amount of power received by the wireless power reception circuit 1050 is sufficient, the on/off signal ON/OFF is deactivated and thus the DC-AC converter 1013 and the rectifier 1053 are deactivated. As a result, it is possible as to minimize unnecessary power loss and improve the overall power efficiency of the system.

Figure 11:
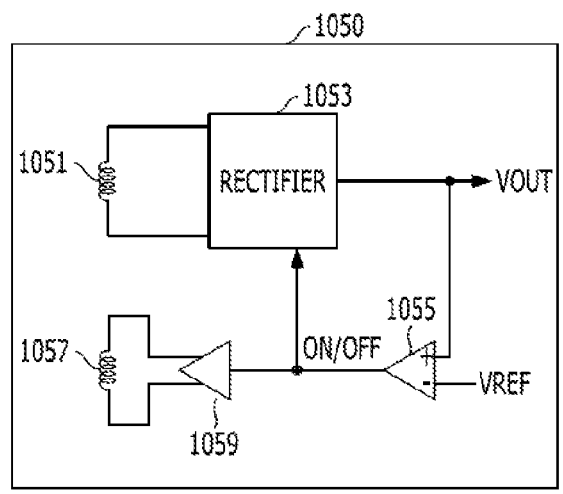
FIG. 11 is a diagram of a wireless power reception circuit in accordance with an embodiment.

FIG. 11 is a diagram of the wireless power reception circuit 1050 of FIG. 10 in accordance with an embodiment. The wireless power reception circuit 1050 includes the power reception coil 1051, the rectifier 1053, the control signal generator 1055, the signal transmitter 1059, and the signal transmission coil 1057.

The power reception coil 1051 inductively couples with the power transmission coil 1015 of the wireless power transmission circuit 1010 and receives AC power thereby. The AC power received in the power reception coil 1051 is rectified by the rectifier 1053 and is converted into DC power. The rectifier 1053 may include a DC-DC converter for converting a received voltage converted into DC into a desired level. An output voltage VOUT of the rectifier 1053 is used to operate internal circuits (not illustrated) of an apparatus including the wireless power reception circuit 1050. The rectifier 1053 is activated or deactivated according to a logic level of the on/off signal ON/OFF.

The control signal generator 1055 generates the on/off signal ON/OFF according to whether the output voltage VOUT of the rectifier 1053 is sufficiently high. The control signal generator 1055 includes a comparator that compares the level of the output voltage VOUT of the rectifier 1053 with a reference voltage VREF, as illustrated in FIG. 11. When the level of the output voltage VOUT is higher than the reference voltage VREF, the on/off signal ON/OFF has a 'high' level, and when the output voltage VOUT is lower than the reference voltage VREF, the on/off signal ON/OFF has a 'low' level. When the on/off signal ON/OFF has a 'low' level, the DC-AC converter 1013 and rectifier 1053 controlled by the on/off signal ON/OFF are activated, and when the on/off signal ON/OFF has a 'high' level, the elements 1013 and 1053 are deactivated.

The on/off signal ON/OFF generated by the control signal generator 1055 is transferred to the wireless power transmission circuit 1010 through the signal transmitter 1059 and the signal transmission coil 1057. In an embodiment, the signal transmitter 1059 includes the transmission circuit 120 shown in FIG. 2.

Figure 12:
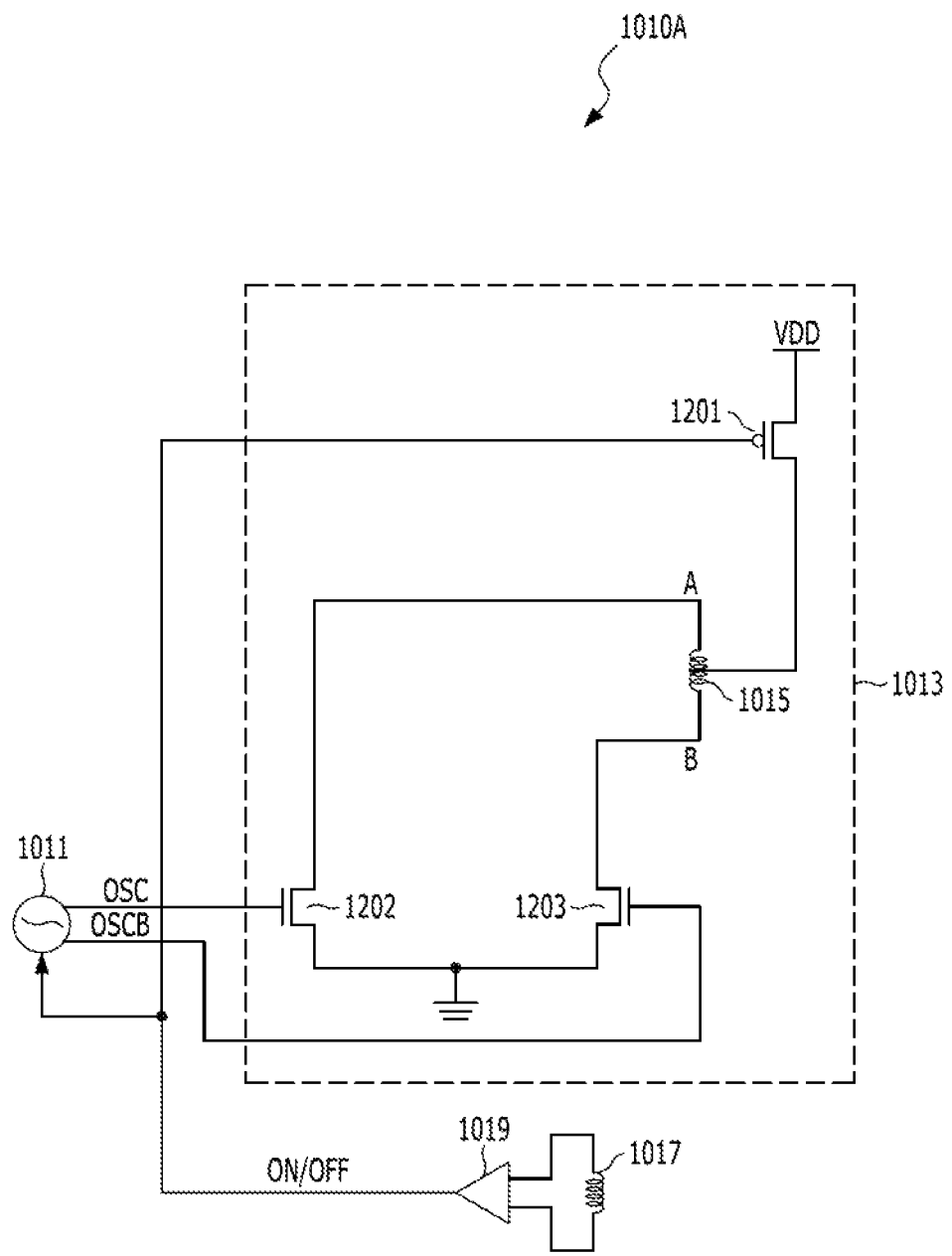
FIG. 12 is a circuit diagram of a wireless power transmission circuit in accordance with a first embodiment.

FIG. 12 is a circuit diagram of a wireless power transmission circuit 1010A in accordance with a first embodiment, suitable for use in the wireless power transmission circuit 1010 of FIG. 10. The wireless power transmission circuit 1010A includes an oscillator 1011, a DC-AC converter 1013A, a power transmission coil 1015, a signal reception coil 1017, and a signal receiver 1019.

The signal receiver 1019 receives the on/off signal ON/OFF from the wireless power reception circuit 1050 through the signal reception coil 1017. The signal receiver 1019 transfers the received on/off signal ON/OFF to the oscillator 1011 and the DC-AC converter 1013A. In an embodiment, the signal receiver 1019 includes the reception circuit 130 described in FIG. 3 or FIG. 5.

The oscillator 1011 generates periodic waves on signals OSC and OSCB. The periodic wave on signal OSC and the periodic wave on signal OSCB have opposite phases, and have logic levels that are continuously changed like a clock, that is, the logic levels alternate between a first state and a second state.

The oscillator 1011 may be activated or deactivated in response to the on/off signal ON/OFF. For example, when the on/off signal ON/OFF has a 'low' level, the oscillator 1011 periodically changes the levels of the periodic waves on signals OSC and OSCB. However, when the on/off signal ON/OFF has a 'high' level, the oscillator 1011 fixes the level of each of the signals OSC and OSCB to a predetermined level.

The DC-AC converter 1013A converts DC power to AC power in response to the periodic waves on the signals OSC and OSCB, and transmits the AC power through the power transmission coil 1015. The DC-AC converter 1013A includes a switch 1201, a first pull-down driver 1202, and a second pull-down driver 1203.

The switch 1201 supplies a high voltage VDD to a center terminal of the power transmission coil 1015 in response to the on/off signal ON/OFF. The center terminal is electrically connected to the power transmission coil 1015 between a first terminal A and a second terminal B of the power transmission coil 1015.

When the on/off signal ON/OFF has a 'low' level, the switch 1201 is turned on to supply the high voltage VDD to the center terminal of the coil 1015. However, when the on/off signal ON/OFF has a 'high' level, the switch 1201 is turned off so that the high voltage VDD is not supplied to the center terminal. Accordingly, when the on/off signal ON/OFF has a 'high' level, the DC-AC converter 1013 is deactivated.

The switch 1201 may be a PMOS transistor as illustrated in FIG. 12. The high voltage supplied by the switch 1201 is illustrated as being the power supply voltage VDD. However, a person of skill in the art would understand that any sufficiently high voltage could be used instead of the power supply voltage VDD.

The first pull-down driver 1202 pull-down drives the first terminal A of the power transmission coil 1015, and the second pull-down driver 1203 pull-down drives the second terminal B of the power transmission coil 1015. The first pull-down driver 1202 and the second pull-down driver 1203 are alternately turned on according to the logic states of the signals OSC and OSCB. When the signal OSC has a 'high' level, the first pull-down driver 1202 is turned on to pull-down drive the first terminal A of the power transmission coil 1015, and when the signal OSCB has a 'high' level, the second pull-down driver 1203 is turned on to pull-down drive the second terminal B of the power transmission coil 1015.

Therefore, the first pull-down driver 1202 and the second pull-down driver 1203 alternately pull-down drive the first terminal A and the second terminal B of the coil 1015, so that AC power is transferred to the wireless power reception circuit 1050 through the coil 1015. The first pull-down driver 1202 and the second pull-down driver 1203 may be NMOS transistors as illustrated in FIG. 12.

Figure 13:
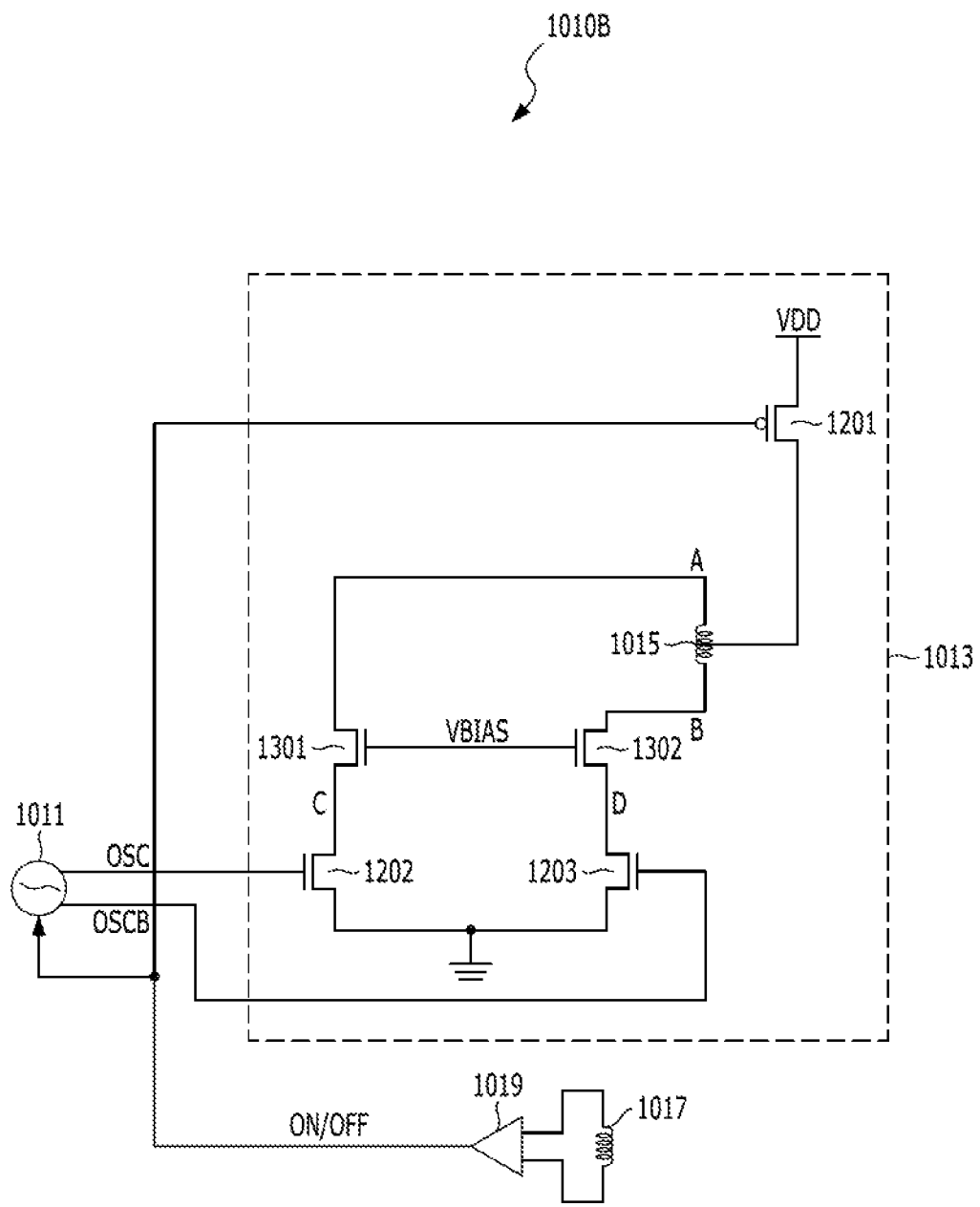
FIG. 13 is a circuit diagram of a wireless power transmission circuit in accordance with a second embodiment.

FIG. 13 is a circuit diagram of a wireless power transmission circuit 1010B in accordance with a second embodiment, suitable for use in the wireless power transmission circuit 1010 of FIG. 10. In the embodiment shown in FIG. 13 as compared to the embodiment of FIG. 12, transistors 1301 and 1302 are added to the DC-AC converter 1013A of FIG. 12.

Because the DC-AC converter is designed to wirelessly transmit power, it generates a large amount of AC power. Therefore, a high internal voltage may occur in the DC-AC converter and as a result the first pull-down driver 1202 and the second pull-down driver 1203 may be subjected to a voltage greater than a breakdown voltage. Accordingly, in the embodiment of FIG. 13, the first and second transistors 1301 and 1302 are added to form a cascode circuit that reduces the probability that the first pull-down driver 1202 and the second pull-down driver 1203 are subjected to the breakdown voltage. The transistors 1301 and 1302 may be NMOS transistors as illustrated in FIG. 13, and an appropriate bias voltage VBIAS for turning on the transistors 1301 and 1302 is applied to gates of the transistors 1301 and 1302.

Figure 14:
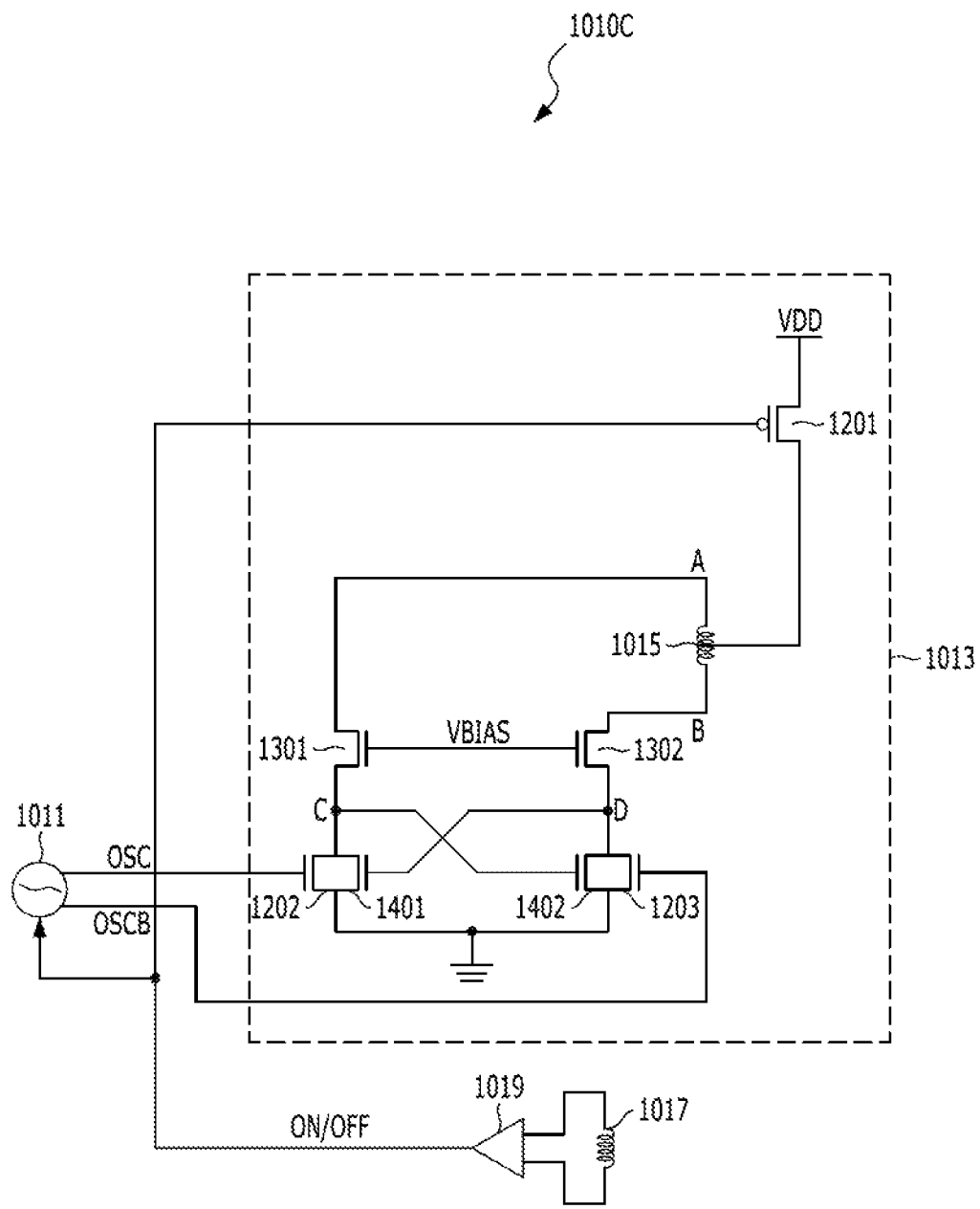
FIG. 14 is a circuit diagram of a wireless power transmission circuit in accordance with a third embodiment.

FIG. 14 is a circuit diagram of a wireless power transmission circuit 1010C in accordance with a third embodiment, suitable for use in the wireless power transmission circuit 1010 of FIG. 10. In the embodiment of FIG. 14 as compared with the embodiment of FIG. 13, a third pull-down driver 1401 and a fourth pull-down driver 1402 are added to the DC-AC converter 1013B of FIG. 13. The third pull-down driver 1401 pull-down drives a node C in response to a level of a node D, and the fourth pull-down driver 1402 pull-down drives the node D in response to the level of the node C. Adding the third pull-down driver 1401 and the fourth pull-down driver 1402 increases the amplification provided by the DC-AC converter 1013B and provides a higher power gain at substantially the same input power.

The third pull-down driver 1401 and the fourth pull-down driver 1402 may be NMOS transistors similar to the first pull-down driver 1202 and the second pull-down driver 1203.

Figure 15:
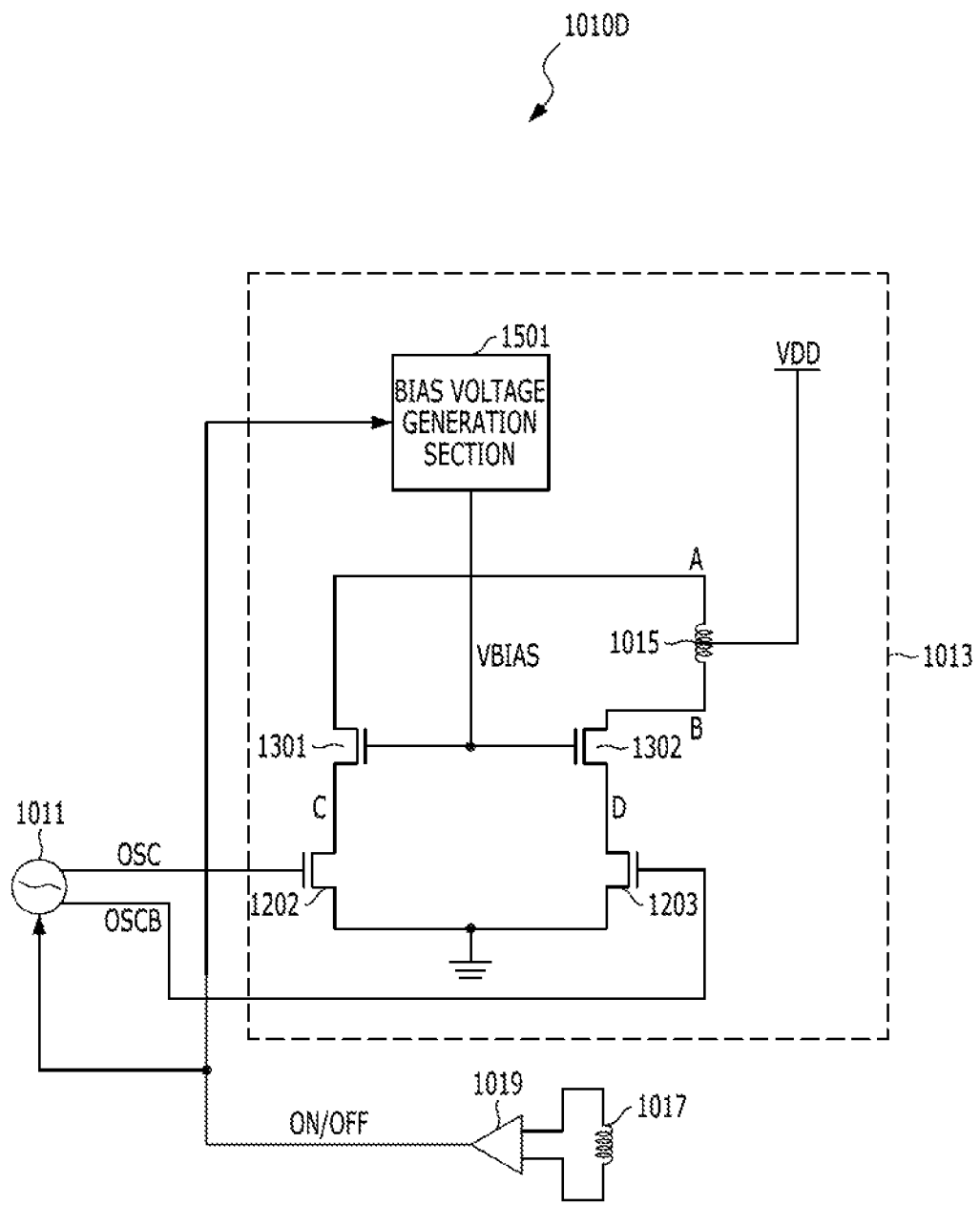
FIG. 15 is a circuit diagram of a wireless power transmission circuit in accordance with a fourth embodiment.

FIG. 15 is a circuit diagram of a wireless power transmission circuit 1010D in accordance with a fourth embodiment, suitable for use in the wireless power transmission circuit 1010 of FIG. 10. In the embodiment of FIG. 15 as compared with the embodiment of FIG. 13, the switch 1201 is removed from the DC-AC converter 1013B and a bias voltage generator 1501 is added. The high voltage VDD is directly applied to the center terminal of the coil 1015 without passing through a switch. Accordingly, the activation or deactivation of the DC-AC converter 1013D is not controlled by the presence or absence of the high voltage VDD at the center terminal of the coil 1015.

Instead, the bias voltage generator 1501 adjusts the level of the bias voltage VBIAS according to the logic level of the on/off signal ON/OFF. When the on/off signal ON/OFF has a 'low' level, the bias voltage generator 1501 generates a bias voltage VBIAS sufficient to turn on the transistors 1301 and 1302. When the on/off signal ON/OFF has a 'high' level, the bias voltage generator 1501 generates a bias voltage VBIAS that turns off the transistors 1301 and 1302. Accordingly, when the on/off signal ON/OFF has a 'low' level, the flow of a current from the coil 1015 to the first pull-down driver 1202 or the second pull-down driver 1203 is not blocked by the transistors 1301 and 1302, and the operation of the DC-AC converter 1013D is activated. However, when the on/off signal ON/OFF has a 'high' level, the flow of the current from the coil 1015 to the first pull-down driver 1202 or the second pull-down driver 1203 is blocked by the transistors 1301 and 1302, and the operation of the DC-AC converter 1013D is deactivated.

In the embodiments of FIGS. 12 through 14, wherein the activation or deactivation of the DC-AC converter is controlled through the switch 1201, all currents of the DC-AC converter flow through the switch 1201. Accordingly, the current flowing through the switch 1201 may be excessive, and a large power loss occurs in the switch 1201. Furthermore, since a large amount of current will flow through the switch 1201, the size of a transistor serving as the switch 1201 should be designed to be very large.

However, in the embodiment of FIG. 15, because the activation or deactivation of the DC-AC converter 1013D is controlled by adjusting the level of the bias voltage VBIAS, the power loss that would otherwise have occurred in the switch 1201 of the embodiments of FIGS. 12 through 14 is reduced as is the power consumption of the DC-AC converter 1013D itself.

Figure 16:
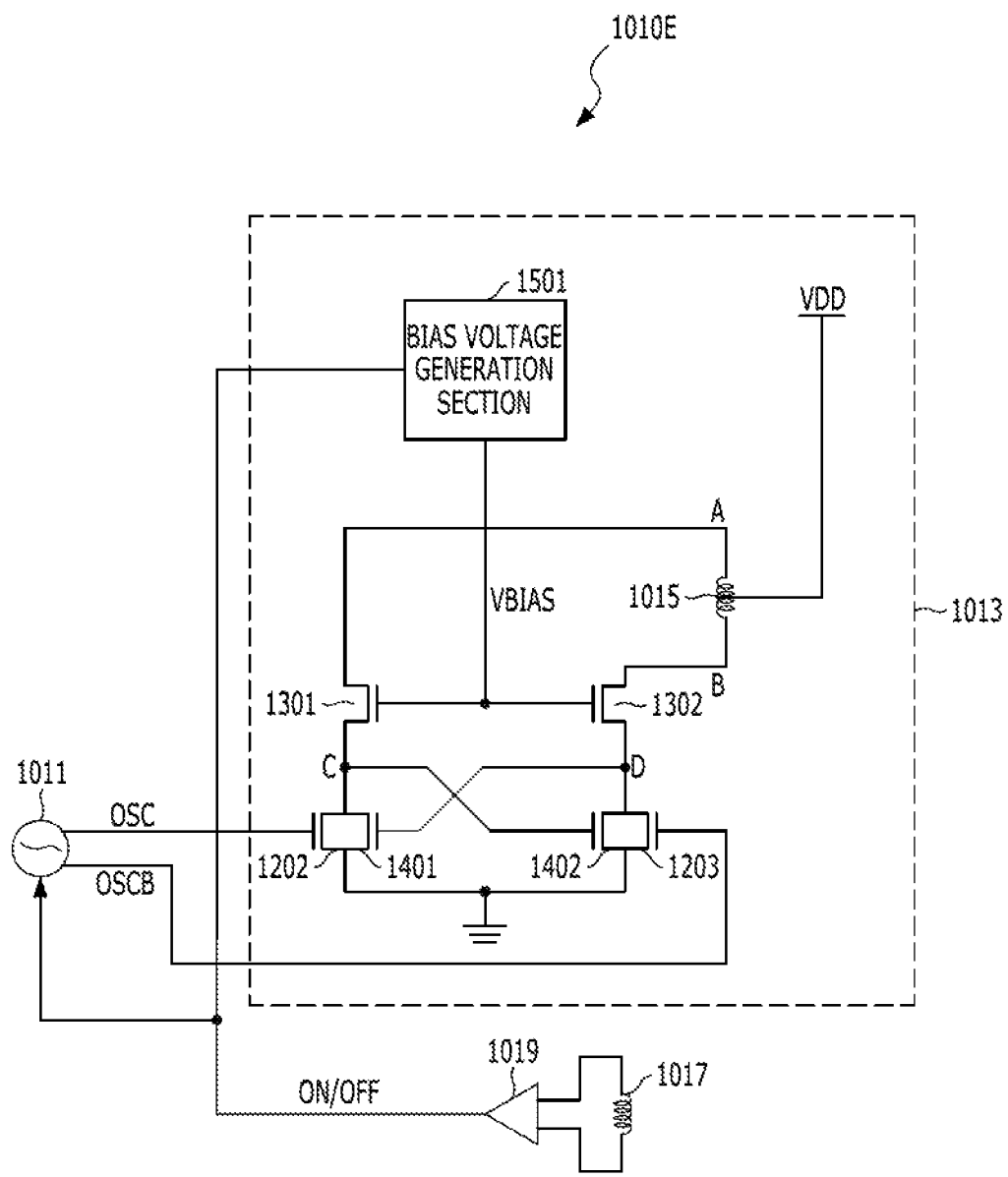
FIG. 16 is a circuit diagram of a wireless power transmission circuit in accordance with a fifth embodiment.

FIG. 16 is a circuit diagram of a wireless power transmission circuit 1010E in accordance with a fifth embodiment, suitable for use in the wireless power transmission circuit 1010 of FIG. 10. In the embodiment of FIG. 16, a DC-AC converter 1013E includes a third pull-down driver 1401 and a fourth pull-down driver 1402 in addition to the DC-AC converter 1013D of the embodiment of FIG. 15. Similarly to as described for the embodiment of FIG. 14, the addition of the third and fourth pull-down drivers 1401 and 1402 to the DC-AC converter 1013D increases the amplification provided by of the DC-AC converter 1013D and produces a high power gain at substantially the same input power.

While the present invention has been described with respect to the specific embodiments, it will be apparent to those skilled in the art that various changes and modifications may be made without departing from the spirit and scope of the invention as defined in the following claims. For example, a person of skill in the art would understand that the devices described herein as NMOS or PMOS transistors could instead be, or could in addition include, one or more MOS transistors, junction field effect transistors, bipolar junction transistors, or other suitable devices.

What is claimed is:

1. A wireless transceiver circuit comprising:
 a coil having a first terminal and a second terminal; and
 a transmission circuit coupled to the first and second terminals,
 wherein the transmission circuit comprises:
 a first pull-up driver configured to source a current to the first terminal;
 a first pull-down driver configured to sink a current from the first terminal;
 a second pull-up driver configured to source a current to the second terminal;
 a second pull-down driver configured to sink a current from the second terminal; and
 a controller, wherein the controller is configured to:
 when a first transmission operation is performed, activate the first pull-up driver and the second pull-down driver;
 when a second transmission operation is performed, activate the second pull-up driver and the first pull-down driver; and
 when a reception operation is performed, activate the first pull-up driver, the first pull-down driver, the second pull-up driver, and the second pull-down driver to supply a bias voltage to the first and second terminals.

2. The wireless transceiver circuit of claim 1, further comprising:
 a reception circuit configured to detect a voltage change across the first terminal and the second terminal, and to restore reception data according to the voltage change.

3. The wireless transceiver circuit of claim 2, wherein the reception circuit comprises:
 a differential amplifier configured to amplify a voltage difference between the first terminal and the second terminal; and
 a differential latch configured to restore the reception data based on signals of positive and negative output terminals of the differential amplifier.

4. The wireless transceiver circuit of claim 2, wherein the reception circuit comprises:

a differential latch configured to latch voltage changes of the first terminal and the second terminal to restore the reception data.

5. The wireless transceiver circuit of claim 4, wherein the reception circuit further comprises:
a differential amplifier configured to amplify the reception data based on a voltage difference between positive and negative output terminals of the differential latch.

6. The wireless transceiver circuit of claim 1, wherein the first or second transmission operation is performed when a logic level of a signal to be transmitted changes.

7. The wireless transceiver circuit of claim 1, wherein:
the first pull-up driver includes a first PMOS transistor for supplying a high voltage to the first terminal in response to a first pull-up driving signal;
the first pull-down driver includes a first NMOS transistor for supplying a low voltage to the first terminal in response to a first pull-down driving signal;
the second pull-up driver includes a second PMOS transistor for supplying the high voltage to the second terminal in response to a second pull-up driving signal; and
the second pull-down driver includes a second NMOS transistor for supplying the low voltage to the second terminal in response to a second pull-down driving signal.

* * * * *